Nov. 29, 1966 HARUYOSHI SUZUKI ETAL 3,288,982
HIGH SPEED ARC WELDING METHOD
Filed March 8, 1965 2 Sheets-Sheet 1
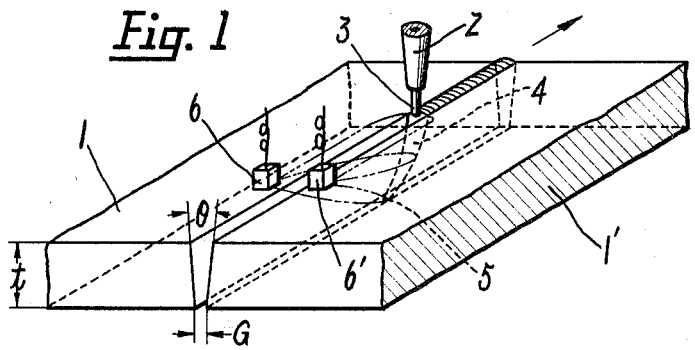
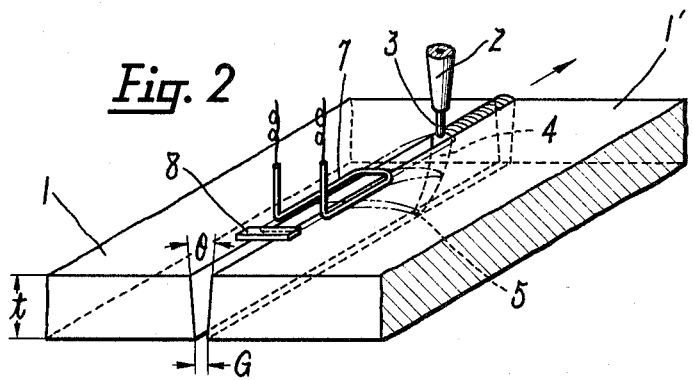
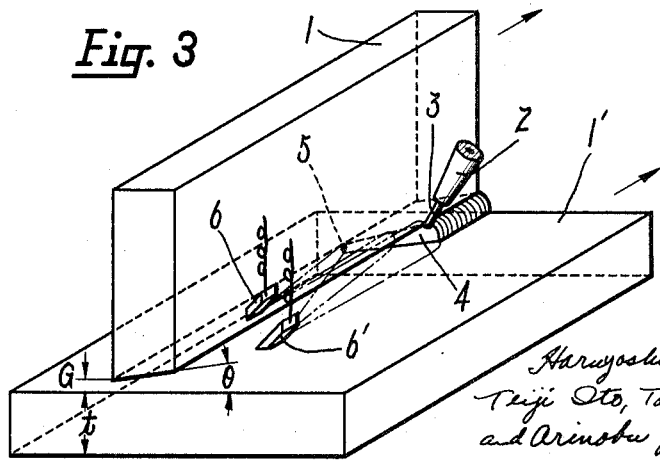
Haruyoshi Suzuki,
Teiji Oto, Takeshi Nishi
and Arinobu Yamada
INVENTORS
BY Wenderoth, Lind & Ponack
ATTORNEYS

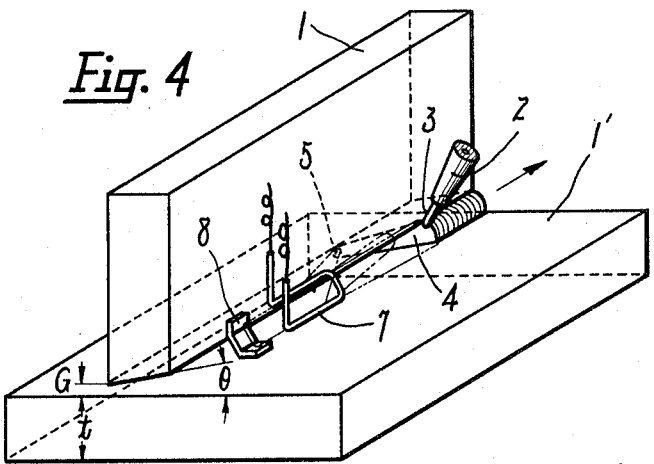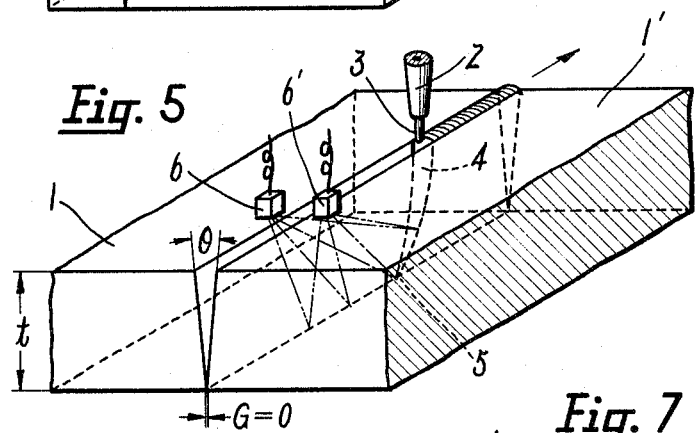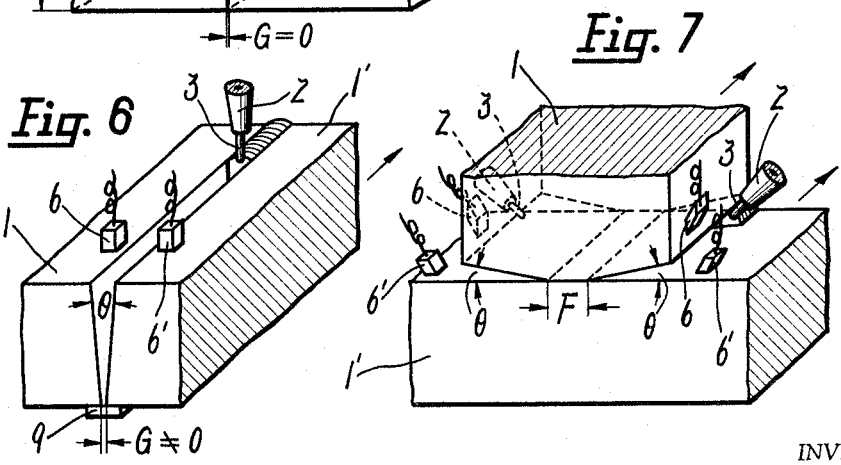

United States Patent Office 3,288,982
Patented Nov. 29, 1966

3,288,982
HIGH SPEED ARC WELDING METHOD
Haruyoshi Suzuki, 193—5 Sekimachi, Nerima-ku, Tokyo, Japan; Teiji Ito, 486 Ohaza, Ohkura, Yawata-ku, Kitakyushu, Fukuoka Prefecture, Japan; Takeshi Nishi, 9 Kobai-cho, Ohaza, Yawata-ku, Kitakyushu, Fukuoka Prefecture, Japan; and Arinobu Yamada, 1—873 Heiga Sakamachi, Ohaza Itozu, Kokura-ku, Kitakyushu, Fukuoka Prefecture, Japan
Filed Mar. 8, 1965, Ser. No. 437,731
Claims priority, application Japan, Mar. 14, 1964,
39/14,168
9 Claims. (Cl. 219—137)

This invention relates to a method of automatic arc-welding of comparatively thick steels, especially of very heavy sections. In this method, thick sections of steel plates or shapes are arc-welded with help of simultaneous heating by a radio-frequency high frequency electric current, so that the welding speed may be increased and the amount of filler metal and welding distortion may be remarkably reduced.

The conventional automatic arc welding methods are represented by submerged arc welding or gas shielded arc welding. But their maximum welding speed is about 2 m./min. at most. If the welding speed is made greater than that, undercutting or lack of fusion will occur and no satisfactory welded joint will be obtained. Furthermore, with an increase of the thickness of the material to be welded, the sectional area of a joint groove becomes larger and larger and multilayer welding is inevitable, thus reducing the welding efficiency.

Needless to say, in order to improve such defects, there have already been taken such steps as, for example, the use of suitable granular fluxes producing a slag of high fluidity or stable arc and the utilization of a multielectrode welding apparatus. However, such steps can only prevent to some extent such defects as poor bead shape or undercut, but can not remarkably increase the welding speed.

An object of the present invention is to provide an automatic arc welding method with which such defects in the conventional methods as are described above are substantially improved and a heavy section welding can be done more efficiently and economically with higher welding speeds, less filler amount (with narrower grooves) and less welding distortion.

The present invention is characterized by heating the groove surfaces of a joint to be welded to a high temperature near the melting point of the base metal by passing a high frequency electric current directly therethrough or causing a high frequency induction current thereon and then feeding a molten metal produced by a single or multiple arcs to the said heated groove.

The drawings show embodiments of the present invention.

FIGURES 1 and 2 are perspective views illustrating manners of butt welding.

FIGURES 3 and 4 are perspective views illustrating manners of welding joints in making T-shape members by welding.

FIGURES 5 and 6 are perspective views illustrating manners of butt-welding heavy sections.

FIGURE 7 is a perspective view illustrating a manner of welding a joint from both sides in making a T-member by welding.

The present invention will be explained in detail in the following with reference to the drawings.

In the drawings, 1 and 1' are base metals to be welded, 2 is a welding electrode, 3 is a welding filler wire, 4 is the surface of molten weld pool metal, 5 is the end of molten weld pool at the root of the groove, 6 and 6' are sliding contact terminals of a high frequency electric current, 7 is a high frequency inducing element (coil), 8 is a sliding element for short-circuiting, 9 is a backing metal, $\theta$ is the groove angle, G is the root gap between the base metals 1 and 1' to be welded and F is the root face.

FIGURE 1 shows a case in which the base metals 1 and 1', $t$ mm. thick, are to be butt-welded with a narrow groove of a root gap G mm. and a groove angle $\theta°$. In welding the base metals 1 and 1', the welding filler wire 3 is fed through the contact tube (electrode) 2 into the narrow groove of angle $\theta°$ and is melted by a welding arc produced between the electrode 2 and the base metals 1 and 1' and the molten deposit metal is fed into the groove. It is necessary that the molten metal in this case should be at a temperature several hundreds of degrees higher than the melting point of the base metals 1 and 1'. According to the results of experiments, a molten metal about 200 to 400° C. higher than the melting point of the base metals 1 and 1' could be made to flow into the groove. On the other hand, preceding the welding arc, a high frequency electric current of about the radio frequency (practically of more than 100,000 cycles per second) is made to flow on the surfaces of the groove and the molten pool 4 and through the sliding contact terminals 6 and 6' kept at a fixed distance from the arc-welding electrode 2. As shown by the one-dot chain lines in the drawing, the go-and-back paths of the radio-frequency electric current are adjacent to each other by the skin effect and the current flows practically only through the surface layer, thus the said surfaces can be quickly heated to a temperature near the melting point of the base metals. Therefore, with the help of the surface tension, the molten filler metal can flow satisfactorily into the groove.

It should be noted here that the narrow root bottom 5 is likely to cause poor fusion with the conventional arc welding methods; however, with the present invented method, the high frequency current can be concentrated satisfactorily onto the root 5, thus introducing good heating and fusion there. In this method, the base metals 1 and 1' move relatively to the electrode 2 and the high frequency current terminals 6 and 6', the relative speed being the welding speed. In practice, mostly the electrode filler wire 3 and the high frequency current terminals 6 and 6' are fixed and the base metals to be welded move in the direction indicated by the arrow in FIG. 1.

Such a welding phenomenon in a very narrow groove in FIG. 1 as is attained by the present invention can not generally be attained by the conventional arc welding methods wherein the base metals and filler are heated and melted only by welding arc and the molten filler metal is fed to the weld pool, because it is so hard for the welding arc to reach the root (bottom part) of the groove having such a small groove angle as is illustrated in FIG. 1 that it is necessary to make the groove angle satisfactorily large so that the arc may reach the bottom part or root of the groove. Therefore, in case the thickness of the base metals to be welded is large, it is necessary to make the groove angle large. For example, in case a V-shaped groove, though different depending on the thickness of the base metals to be welded, the groove angle is usually 40 to 90 degrees in the conventional arc welding methods and accordingly a large amount of deposited metal is required. On the other hand, in the present invention, as the groove surfaces are preheated and the forward end surface 5 of the molten weld metal is heated by the high frequency electric current as described above, it is possible to weld with one pass the base metals 1 and 1' of a large thickness and a very narrow groove form. For example, the adequate root gap is about 0.5 mm., the groove angle may be less than 15 degrees, practically 5 to 6 degrees are satisfactory. Therefore, the molten filler metal to be fed is very little. As another advantage, the welding distortion is very small. Further, as such a high frequency current as of about the radio frequency (practically of more than 100,000 cycles per second) is used, the heating will be concentrated on the surface part and is very effective. In this case, the groove surfaces should be heated more than 800° C. Therefore, the affinity between the base metals 1 and 1' to be welded and the fed molten deposited metal becomes so high that, even when they are welded at such a high speed as more than 2 m./min., such welding defects as undercuts and poor bead shapes can be avoided.

The case of high frequency electric resistance-heating through the sliding contact terminals 6 and 6' according to the present invention is explained in FIG. 1. However, it is well possible even with high frequency induction heating. An example of such case is shown in FIG. 2, in which there is required a device to concentrate the induction current on the required groove surfaces and the molten weld pool surface. That is to say, a high frequency inducer coil 7 is set above the groove at several millimeters above the flat surface of the base metals 1 and 1' to be welded and the short-circuiting slider 8 is placed behind a high frequency inducer coil 7, that is, on the other side of the filler metal so that the paths of the electric current flowing on the surfaces of the base metals 1 and 1' may become as represented by the one-dot chain lines in FIG. 2 and welding may be possible by the same principle as in FIG. 1.

The relative distance between the arc electrode 3 and the high frequency sliding terminals 6 or inducer 7 is determined so that the high frequency current may be well distributed on the groove surfaces in order to heat the surface of molten weld pool and the root of the joint.

The above butt-joint welding method shown in FIGURES 1 and 2 can be easily applied to T-joint or lapped joint fillet welding, for example in producing T-shape or I-shape members by welding. The cases of making T-shape members are shown in FIGURES 3 and 4. FIG. 3 is of the case of high frequency current resistance-heating, while FIG. 4 is of the case of high frequency induction heating. Although these examples are shown for T-joint, it is needless to say that the present invention can be very effectively applied also to lap welded joints. The welding principle in such case is exactly the same as in the case of FIGURES 1 and 2.

The slider 8 is specifically provided in order to concentrate the heating current on the groove surfaces and the molten weld pool surface in the case of induction current circuits as represented by the one-dot chain lines in FIGURES 2 and 4.

Further, according to the present invention, in the case of a butt joint of plates of a considerably large thickness, welding can be made by using such manner in which $G=0$ as is illustrated in FIG. 5 or such backing metal 9 as is shown in FIG. 6. Further, a thick T-joint may be welded from both sides by keeping the root face F in close contact, for example, in the manner illustrated in FIG. 7. In such case, the width F of the root face may be zero or any other value.

*Example*

An example of the case illustrated in FIG. 1 is given in the following.

Mild steel plates 10 mm. thick were butt-welded by using—

Groove shape:
    Root gap 0.5 mm., groove angle 5°.
High frequency source:
    400 kc., 140 kw.
Arc welding:
    $CO_2$-arc, mild steel filler wire of 2.0 mm.
    Arc current 650 a.
    $CO_2$ flow, 20 l./min.
    Direct current reverse polarity (wire positive)
    Constant potential type As a result, a high welding speed of about 6 meters per minute was obtained. Needless to say, no pressure was required at all. If it were carried out by the conventional arc welding method, the welding speed would be about 1 meter per minute.

These conditions can be applied to a T-joint when the form of the groove is made the same with the above example.

As explained in detail in the above, according to the present invention, when the thin layers of the groove surfaces of the materials to be welded and the surface of the molten weld pool are electrically resistance-heated by passing a high frequency electric current directly or a high frequency induction current indirectly, it will be possible to weld the base metals at a high speed with a very small amount of the filler metal. Therefore, in the method of the present invention, the total electric power consumption is considerably smaller than in the conventional automatic arc welding methods. Moreover, such pressure between the base metals to be welded as is always required in the electric resistance welding is not required at all and a comparatively simple equipment is good enough.

Further, in the present invention, as the welding arc is not required to heat and melt the base metals to be welded, a series arc system is sufficient to feed the filler metal and can be rather said to be preferably.

The embodiments in FIGURES 1 to 7 are explained with a consumable arc electrode system. However, a cold wire system for melting the welding wire with a non-consumable electrode arc is also available. Further, either a granular flux or a gas shield system or a flux-and-gas shield system may be used to protect the molten metal from the atmosphere. However, the gas shield system is preferable to prevent such defect as slag inclusion.

What is claimed is:

1. A non-pressure arc welding method for arc welding thick metal plates at high speed and with a welding rod, consisting essentially of the steps of providing a small angle groove between the plates to be welded, passing a high frequency current through the surface portions of the plates defining said groove and through weld metal deposited in said groove from the arc welding rod and electrode, to heat the said surface portions to a temperature above 900° C., and continuing to pass said high frequency current and deposit weld metal from said welding rod and electrode at a rate sufficient to completely fill said groove during a single pass by arc welding and arc welding said plates in a single pass at a speed of more than two meters per minute.

2. A method as claimed in claim 1 in which said high frequency current is applied directly to said surface portions.

3. A method as claimed in claim 1 in which said high frequency current is induced in said surface portions.

4. A method as claimed in claim 1 in which the included angle of said groove is less than 15°.

5. The method according to claim 1 wherein the high frequency electric current has a frequency of more than 100,000 cycles per second.

6. The method according to claim 2 wherein the high frequency electric current is passed by setting a pair of sliding contact terminals against the plates at a point preceding the position of arc welding in the groove between the plates to be welded.

7. The method according to claim 3 wherein the high frequency induction current is passed by placing a high frequency current inducer adjacent the plates at a point preceding the position of arc welding in the groove between the plates to be welded and placing a short circuiting sliding member between said plates adjacent said inducer.

8. The method according to claim 1 wherein the relative distance between the arc electrode and the high frequency terminals is such that the high frequency electric current will be well distributed on the groove surfaces in order to heat the surface of molten deposited weld metal and the root of the joint.

9. The method according to claim 3 wherein the relative distance between the arc electrode and the high frequency inducer is such that the high frequency induction current will be well distributed on the groove surfaces in order to heat the surface of molten deposited weld metal and the root of the joint.

References Cited by the Examiner

UNITED STATES PATENTS

| | | | |
|---|---|---|---|
| 2,453,061 | 11/1948 | Bissout et al. | 219—137 |
| 2,794,108 | 5/1957 | Park | 219—67 |
| 2,931,885 | 4/1960 | Underwood et al. | 219—67 |

RICHARD M. WOOD, *Primary Examiner.*